United States Patent
Linde et al.

(10) Patent No.: US 12,208,913 B2
(45) Date of Patent: Jan. 28, 2025

(54) FUSELAGE SECTION OF AN AIRCRAFT, AIRCRAFT FUSELAGE, AND AIRCRAFT

(71) Applicant: Airbus Operations GmbH, Hamburg (DE)

(72) Inventors: Peter Linde, Hamburg (DE); Matthias Hegenbart, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 17/849,774

(22) Filed: Jun. 27, 2022

(65) Prior Publication Data

US 2022/0411092 A1 Dec. 29, 2022

(30) Foreign Application Priority Data

Jun. 28, 2021 (EP) .................................. 21181961

(51) Int. Cl.
*B64D 37/04* (2006.01)

(52) U.S. Cl.
CPC .................................. *B64D 37/04* (2013.01)

(58) Field of Classification Search
CPC .............................. B64D 37/04; B64D 37/00
See application file for complete search history.

(56) References Cited

U.S. PATENT DOCUMENTS

| 3,243,150 A | 3/1966 | Reed | |
| 3,951,362 A * | 4/1976 | Robinson | B64D 37/06 220/560.07 |
| 5,833,172 A | 11/1998 | Grafwallner et al. | |
| 6,347,719 B1 * | 2/2002 | Rosen | B64D 37/30 220/586 |
| 7,234,667 B1 * | 6/2007 | Talmage, Jr. | B64C 39/024 244/120 |
| 2004/0129836 A1 * | 7/2004 | Seidel | B64D 27/02 244/120 |
| 2004/0245382 A1 * | 12/2004 | Nozaki | B64D 37/04 244/53 R |
| 2005/0089661 A1 * | 4/2005 | Hogenson | B64D 37/06 428/36.5 |

(Continued)

FOREIGN PATENT DOCUMENTS

| DE | 102004015319 B4 * | 9/2008 | B64C 1/00 |
| DE | 102014107316 A1 * | 11/2015 | B64D 37/04 |

(Continued)

OTHER PUBLICATIONS

Code Of Federal Regulations: 14 CFR 25.841(a). Accessed digitally via https://www.ecfr.gov/current/title-14/part-25/section-25.841#p-25.841(a). Jan. 2021-current. (Year: 2021).*

(Continued)

*Primary Examiner* — Philip J Bonzell
*Assistant Examiner* — Anna L. Gordon
(74) *Attorney, Agent, or Firm* — KDW Firm PLLC

(57) ABSTRACT

In order to improve liquid hydrogen storage on aircraft, a liquid hydrogen tank is integrated into the fuselage of the aircraft. At least one portion of the tank wall is formed by specially adapted tank skin panels and/or a pressure bulkhead. The parts forming the tank wall are strengthened to contain a tank pressure of about 3 bar.

19 Claims, 1 Drawing Sheet

(56) References Cited

U.S. PATENT DOCUMENTS

| | | | |
|---|---|---|---|
| 2010/0019084 A1* | 1/2010 | Sisk | G06Q 10/087 |
| | | | 244/1 R |
| 2010/0170997 A1 | 7/2010 | Smith | |
| 2012/0228427 A1* | 9/2012 | Sayilgan | B64C 1/068 |
| | | | 244/121 |
| 2014/0117163 A1* | 5/2014 | Simpson | B64D 37/30 |
| | | | 244/135 R |
| 2019/0367145 A1* | 12/2019 | Cheng | B32B 5/02 |
| 2021/0339858 A1* | 11/2021 | Ermanoski | B64D 27/24 |
| 2021/0381429 A1* | 12/2021 | Taylor | F02C 6/00 |
| 2023/0392752 A1* | 12/2023 | Mcklveen | F17C 7/00 |

FOREIGN PATENT DOCUMENTS

| | | | | |
|---|---|---|---|---|
| FR | 3100798 A1 * | 3/2021 | | B64D 37/00 |
| GB | 2522080 A * | 7/2015 | | B64D 33/02 |

OTHER PUBLICATIONS

Brewer et al., "Hydrogen usage in air transportation," International Journal of Hydrogen Energy, Elsevier, Amsterdam, NL, vol. 3, No. 2, Jan. 1, 1978, pp. 217-229.

European Search Report for Application No. 21181961 dated Dec. 6, 2021.

* cited by examiner

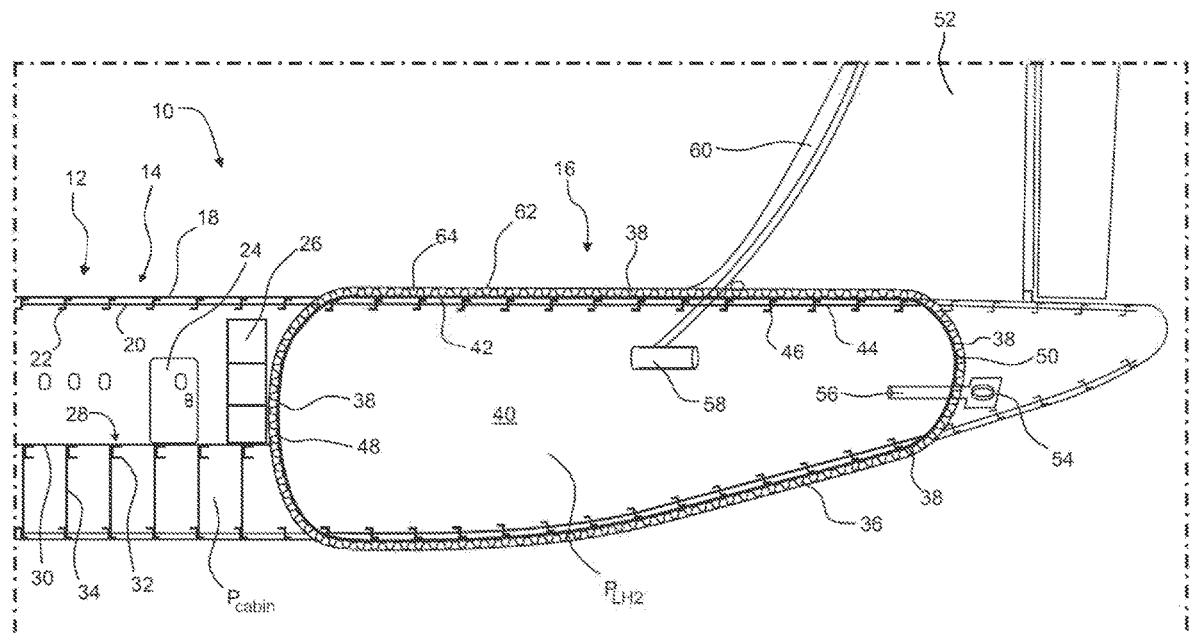

FUSELAGE SECTION OF AN AIRCRAFT, AIRCRAFT FUSELAGE, AND AIRCRAFT

CROSS-REFERENCE TO RELATED APPLICATION

This application claims priority to European Patent Application No. 21181961.0 filed Jun. 28, 2021, the entire disclosure of which is incorporated by reference herein.

TECHNICAL FIELD

The disclosure herein relates to a fuselage section of an aircraft. The disclosure herein further relates to an aircraft fuselage and an aircraft having such a fuselage section or fuselage.

BACKGROUND

In future air travel carbon emissions should be reduced or avoided completely. There are two general propulsion systems that are considered. On the one hand electrically driven aircraft are considered. On the other hand, hydrogen is in principle considered a good option to completely remove carbon emissions. However, storage of hydrogen as a gas or liquid is not easy.

In the past some hydrogen demonstrators were constructed by adding a separate hydrogen tank in the cabin and air travel a single engine connected to the tank for testing.

SUMMARY

It is an objective of the disclosure herein to improve hydrogen tanks for aircraft.

The objective is achieved by the subject matter disclosed herein. Preferred embodiments are disclosed herein.

The disclosure herein provides a fuselage section of an aircraft, wherein the fuselage section has a liquid hydrogen tank adapted for storing liquid hydrogen and a pressure bulkhead and/or at least one tank skin panel, wherein the liquid hydrogen tank has a tank wall that encloses a tank volume for storing the liquid hydrogen, wherein the tank wall comprises a tank wall portion that is formed by the pressure bulkhead and/or the at least one tank skin panel.

Preferably, the fuselage section comprises a second pressure bulkhead that is arranged spaced along a forward-aft direction from the pressure bulkhead.

Preferably, the pressure bulkhead and/or the second pressure bulkhead are fixed to at least one tank skin panel. Preferably, the pressure bulkhead and/or the second pressure bulkhead are welded and/or riveted to at least one tank skin panel.

Preferably, the tank wall is strengthened such that it can withstand a tank pressure in the tank volume above 1 bar, preferably up to 5 bar, more preferably up to 3 bar.

Preferably, the liquid hydrogen tank comprises a refilling tube that fluidly connects the tank volume to an external connector that is arranged to receive a supply connector for refilling liquid hydrogen.

Preferably, the liquid hydrogen tank comprises an evacuation tube and a pressure regulation device that is configured for, when a tank pressure exceeds a predetermined pressure threshold, discharge hydrogen gas from the tank volume via the evacuation tube to the environment.

Preferably, the liquid hydrogen tank has a thermal insulation that is disposed on the tank wall.

Preferably, the fuselage section comprises an external protective skin that is disposed on the liquid hydrogen tank, so as to protect the liquid hydrogen tank from foreign objects impacting thereon.

The disclosure herein provides an aft fuselage section or a forward fuselage section, characterized by a preferred fuselage section, wherein the pressure bulkhead separates a passenger section from the tank volume.

Preferably, the cabin pressure in the passenger section is lower than a tank pressure in the tank volume.

The disclosure herein provides an aircraft fuselage of an aircraft, characterized by at least one preferred fuselage section.

The disclosure herein provides an aircraft comprising a preferred fuselage section and/or a preferred aircraft fuselage, and at least one engine that is configured for operating with liquid hydrogen as a fuel, wherein the tank volume is fluidly connected to the engine, so as to enable fluid transport of hydrogen from the tank volume to the engine.

The disclosure herein proposes using a tank section of an aircraft fuselage of an aircraft for storing liquid hydrogen as a fuel supply for the aircraft.

The idea is to create a fuselage structure having an integrated liquid hydrogen tank, made from stiffened metal or composite panels and pressure bulkheads, in which all joints are welded or riveted. This configuration can as well be adapted to fore- and aft tank concepts and basically any other configuration.

The skin, stringers and frames in the tank-section are preferably sized thicker than in the cabin-section, due to the higher internal pressure. Yet, overall the ideas presented herein save considerable weight compared with having a separate, non-structural liquid hydrogen tank inside the fuselage, with separate brackets and strengthened sections in the fuselage. In particular, the avoidance of a regular rear pressure bulkhead in the fuselage, and a separate, pressurized end-section of the liquid hydrogen tank, instead designed as one bulkhead, is able to save considerable space and weight.

Due to the integration into the fuselage, the inventive solution reduces not only weight but also manufacturing time and as a result costs. Compared to other solution, it is one of the lightest weight solutions. The liquid hydrogen tank preferably uses strengthened fuselage stiffened skin (panels) as pressure vessel. Preferably, there is only one pressure bulkhead between the passenger (PAX) section and the liquid hydrogen tank, which further contributes to weight reduction. With this idea, no separate brackets are needed to keep liquid hydrogen tank in place. It is also not necessary to have an extra structure for tank integration and support structure. The disclosure herein is made on the idea that the fuselage skin can act also as a liquid hydrogen (LH2) tank wall. The fuselage skin hence has the double function for flight load carrying and LH2 containment.

The LH2 tank is integrated into the fuselage and uses modified airframe fuselage skin panels and the rear pressure bulkhead as its tank wall. The LH2 tank can be externally insulated.

BRIEF DESCRIPTION OF THE DRAWING

Embodiments of the disclosure herein are described in more detail with reference to the accompanying drawing.

FIG. 1 depicts a longitudinal section of an aircraft fuselage according to the disclosure herein.

DETAILED DESCRIPTION

FIG. 1 partially depicts a longitudinal section of an aircraft 10. The aircraft 10 has an aircraft fuselage 12. The aircraft fuselage 12 is divided into a passenger section 14 and a tank section 16.

The passenger section 14 comprises the usual components such as skin panels 18, stringers 20, and frame 22. The passenger section 14 may comprise in a manner known per se a passenger door 24, a galley 26, and a floor 28. The floor 28, for example, has a plurality of floor panels 30 that are supported by cross beams 32. The cross beams 32 are in turn supported by floor support beams 34, which rest on skin panels 18. The passenger section 14 has a cabin pressure $P_{cabin}$. Typical cabin pressure values are around 0.6 bar when in cruise flight or higher depending on the cruising altitude of the aircraft 10.

The tank section 16 is disposed adjacent to the passenger section 14. The tank section 16 comprises a liquid hydrogen tank 36 that is configured for storage of liquid hydrogen (LH2). The liquid hydrogen tank 36 has a tank wall 38 that encloses a tank volume 40, in which the LH2 is stored.

The tank section 16 comprises tank skin panels 42, tank stringers 44, and tank frames 46. The tank skin panels 42, the tank stringers 44, and the tank frames 46 partially form the tank wall 38 and may be strengthened compared to the corresponding parts of the passenger section 14. Preferably, the parts have a greater thickness. The tank skin panels 42, the tank stringers 44, and the tank frames 46 are strengthened such that a tank pressure $P_{LH2}$ of up to 3 bar to 5 bar can be easily maintained in the tank volume 40.

The tank section 16 further comprises a pressure bulkhead 48. The pressure bulkhead 48 is welded and/or riveted to the tank skin panels 42. The pressure bulkhead 48 is arranged adjacent to the passenger section 14 and separates it from the tank section 16. In contrast to conventional pressure bulkheads, the pressure bulkhead 48 domes towards the passenger section 14 instead of away from it. The pressure bulkhead 48 also forms part of the tank wall 38.

The tank section 16 further comprises a second pressure bulkhead 50. The second pressure bulkhead 50 is arranged opposite the pressure bulkhead 48 along the forward-aft direction. The second pressure bulkhead 50 is arranged beneath the vertical tail plane 52, for example. The second pressure bulkhead 50 domes towards aft in the usual manner. The second pressure bulkhead 50 may be smaller in diameter than the pressure bulkhead 48.

The tank section 16 comprises an external connector 54 for connecting a fuel supply for refueling. The external connector 54 is disposed on one of the tank skin panels 42. The external connector 54 is fluidly connected to the tank volume 40 by a refilling tube 56.

Furthermore, the tank section 16 includes a pressure regulating device 58 that is configured to release hydrogen gas to the environment through an evacuation tube 60, when a predetermined threshold is exceeded by the tank pressure $P_{LH2}$. Here, the evacuation tube 60 is running through the vertical tail plane 52.

The tank section 16 may include a thermal insulation 62. The thermal insulation 62 is arranged on the tank skin panels 42 and/or the pressure bulkhead 48 and/or the second pressure bulkhead 50.

The tank section 16 preferably has an external protective skin 64. The external protective skin 64 is arranged on the tank wall 38, preferably on the thermal insulation 62. The external protective skin 64 prevents impact of foreign objects on the tank wall 38 or the thermal insulation 62, thereby reducing the risk of leaks.

In order to improve liquid hydrogen storage on aircraft 10, the disclosure herein proposes a liquid hydrogen tank 36 that is integrated into the fuselage 12 of the aircraft 10. At least one portion of the tank wall 38 is formed by specially adapted tank skin panels 42 and/or a pressure bulkhead 48. The parts forming the tank wall 38 are strengthened so as to contain a tank pressure $P_{LH2}$ of about 3 bar.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 aircraft
12 fuselage
14 passenger section
16 tank section
18 skin panel
20 stringers
22 frame
24 passenger door
26 galley
28 floor
30 floor panels
32 cross beams
34 floor support beams
36 liquid hydrogen tank
38 tank wall
40 tank volume
42 tank skin panel
44 tank stringer
46 tank frame
48 pressure bulkhead
50 second pressure bulkhead
52 vertical tail plane
54 external connector
56 refilling tube
58 pressure regulating device
60 evacuation tube
62 thermal insulation
64 external protective skin
$P_{cabin}$ cabin pressure
$P_{LH2}$ tank pressure

The invention claimed is:

1. A fuselage of an aircraft, the fuselage comprising:
   a passenger section; and
   a tank section that forms a liquid hydrogen tank for storing liquid hydrogen therein, the tank section comprising:
      a tank wall that encloses a tank volume for storing the liquid hydrogen, the tank wall comprising:
         tank skin panels that form a portion of the tank wall;

a pressure bulkhead that is attached to the tank skin panels and extends between diametrically opposed portions of the portion of the tank wall formed by the tank skin panels, such that the pressure bulkhead forms another portion of the tank wall; and tank stringers and/or tank frames that are attached to an inner surface of the tank skin panels, internal to the tank volume enclosed by the tank wall;

wherein the pressure bulkhead is arranged adjacent to the passenger section and separates the passenger section from the tank section; and wherein the pressure bulkhead has a domed shape that extends towards the passenger section, the domed shape having, in at least a vertical cross-sectional plane of the fuselage, a continuously curved profile extending between the tank skin panels that define an upper surface and a lower surface, respectively, of the tank section of the fuselage;

wherein the tank wall is formed by skin panels of a skin of the fuselage; and wherein the tank wall is thicker than skin panels of the skin of the fuselage in the passenger section.

2. The fuselage according to claim 1, wherein the tank wall comprises a second pressure bulkhead that is spaced along a forward-aft direction from the pressure bulkhead.

3. The fuselage according to claim 2, wherein the second pressure bulkhead is fixed to the tank skin panels and forms yet another portion of the tank wall.

4. The fuselage according to claim 3, wherein the second pressure bulkhead is smaller in diameter than the pressure bulkhead.

5. The fuselage according to claim 1, wherein:
the passenger section comprises skin panels and stringers and/or frames that are attached to the skin panels; and
the tank skin panels, the tank stringers, and/or the tank frames of the portion of the tank wall is or are strengthened relative to the skin panels, stringers, and/or frames of the passenger section, such that the liquid hydrogen tank formed by the tank section can withstand a tank pressure in the tank volume of 1 bar or more.

6. The fuselage according to claim 5, wherein the tank pressure is up to 5 bar.

7. The fuselage according to claim 5, wherein the tank pressure is up to 3 bar.

8. The fuselage according to claim 5, wherein:
the passenger section comprises skin panels and stringers and/or frames that are attached to the skin panels; and
the tank skin panels, the tank stringers, and/or the tank frames is/are strengthened relative to the skin panels, stringers, and/or frames, respectively, of the passenger section, such that the liquid hydrogen tank can withstand a tank pressure in the tank volume of up to 5 bar.

9. The fuselage according to claim 1, wherein the tank section comprises an external connector for connecting a fuel supply for refueling the liquid hydrogen tank with liquid hydrogen.

10. The fuselage according to claim 9, wherein:
the tank wall comprises a second pressure bulkhead that is spaced along a forward-aft direction from the pressure bulkhead, fixed to the tank skin panels, and forms yet another portion of the tank wall; and
the external connector is disposed on the second pressure bulkhead.

11. The fuselage according to claim 10, comprising a refilling tube that passes through the second pressure bulkhead for fluidically connecting the external connector to the tank volume for providing a flow of the liquid hydrogen from the external connector into the liquid hydrogen tank during the refueling.

12. The fuselage according to claim 10, wherein the tank section comprises:
a thermal insulation arranged over an external surface of the tank skin panels, the pressure bulkhead, and/or the second pressure bulkhead; and
an external protective skin disposed on an external surface of the thermal insulation, such that the thermal insulation is between the external protective skin and the tank skin panels, to protect the liquid hydrogen tank from being impacted by foreign objects.

13. The fuselage according to claim 1, wherein the liquid hydrogen tank comprises an evacuation tube and a pressure regulator that is configured to, when a tank pressure exceeds a predetermined pressure threshold, discharge hydrogen gas from the tank volume via the evacuation tube to the environment.

14. The fuselage according to claim 1, wherein the tank section comprises a thermal insulation arranged over an external surface of the tank skin panels and/or the pressure bulkhead.

15. The fuselage according to claim 14, wherein the tank section comprises an external protective skin disposed on an external surface of the thermal insulation, such that the thermal insulation is between the external protective skin and the tank skin panels, to protect the liquid hydrogen tank from being impacted by foreign objects.

16. The fuselage according to claim 1, wherein the pressure bulkhead is welded and/or riveted to the tank skin panels, so that the pressure bulkhead extends over an entirety of a diameter of the fuselage in the tank section.

17. The fuselage according to claim 1, wherein a cabin pressure in the passenger section is lower than a tank pressure in the tank volume.

18. An aircraft comprising the fuselage according to claim 1, and at least one engine that is configured for operating with liquid hydrogen as a fuel, wherein the tank volume is fluidly connected to the engine to enable fluid transport of hydrogen from the tank volume to the engine.

19. A method of storing liquid hydrogen, the method comprising:
providing an aircraft having the fuselage according to claim 1; and
storing the liquid hydrogen in the liquid hydrogen tank as a fuel supply for the aircraft.

* * * * *